United States Patent [19]
Haferl

[11] Patent Number: 5,661,375
[45] Date of Patent: Aug. 26, 1997

[54] INNER RASTER DISTORTION CORRECTION CIRCUIT

[75] Inventor: Peter Eduard Haferl, Adliswil, Switzerland

[73] Assignee: RCA Thomson Licensing Corporation, Princeton, N.J.

[21] Appl. No.: 366,417

[22] Filed: Dec. 29, 1994

[30] Foreign Application Priority Data

Jan. 25, 1994 [GB] United Kingdom ............ 9401364

[51] Int. Cl.$^6$ .................................................. G09G 1/04
[52] U.S. Cl. ................................................... 315/311
[58] Field of Search ...................................... 315/371, 408

[56] References Cited

U.S. PATENT DOCUMENTS

| | | | |
|---|---|---|---|
| 4,565,949 | 1/1986 | Haferl | 315/371 |
| 4,719,392 | 1/1988 | Haferl | 315/371 |
| 5,115,171 | 5/1992 | Haferl | 315/371 |
| 5,194,784 | 3/1993 | Tripod | 315/371 |

FOREIGN PATENT DOCUMENTS

| | | |
|---|---|---|
| 0146345 | 6/1985 | European Pat. Off. |
| 0236064 | 9/1987 | European Pat. Off. |
| 0332091 | 9/1989 | European Pat. Off. |
| 3442818 | 6/1985 | Germany |

*Primary Examiner*—Gregory C. Issing
*Attorney, Agent, or Firm*—Joseph S. Tripoli; Joseph J. Laks; Daniel E. Sragow

[57] ABSTRACT

A modulation circuit ($Q_1$) supplies a correction current ($i_2$) to an S-shaping capacitor ($C_{23}$) to modulate the voltage across a deflection winding ($L_H$) for correction of inner raster distortion. The frequency of the correction current is lower than line frequency for the correction of inner pincushion or barrel distortion. For correction of second order inner pincushion or barrel distortion, the frequency is higher than line frequency. The direction of the correction current in the S-capacitor can be made the same or opposite to the deflection current, resulting in an additive or a subtractive correction. The amount of the inner correction is adjustable independent of the outside raster correction. The modulation circuit is driven by deflection energy and is independent of the flyback transformer ($T_{20}$).

17 Claims, 4 Drawing Sheets

INNER RASTER DISTORTION CORRECTION CIRCUIT

BACKGROUND

Large screen CRT displays may require a high amount of inner raster distortion correction for adequate raster linearity. The commonly used east-west pincushion distortion correction circuit using a diode modulator can correct some inner pincushion distortion. It has been found, however, that the correction of larger inner raster distortion errors is difficult. Furthermore, because prior art correction of inner raster distortion is difficult or impossible to be adjusted, the results are often unsatisfactory.

Horizontal deflection circuits commonly employ resonant trace and retrace principles. During retrace, the deflection circuit forms a high frequency parallel resonant circuit: energy is supplied to the deflection circuit from the flyback transformer primary winding. During the trace interval, a deflection switch provides a low frequency series resonant circuit formed by the deflection yoke winding and the S-shaping capacitor. As a result, energy circulates from the yoke to the S-capacitor and back to the yoke in one trace period. This produces a sinewave shaped deflection current with a conduction angle of approx. 130°, starting at about 115° and ending at about 245°. The retrace provides a fast return of the deflection current from the nominal 245° position at the end of trace to the nominal 130° position at the start of trace.

The value of the S-capacitor determines the conduction angle or the S-shaping of the deflection current. Thus, the S-capacitor is selected for best horizontal linearity. The voltage across the S-capacitor is cosine shaped. The amplitude is highest at the center of trace, when the deflection current is zero. The correction of inner raster distortion requires modulation of the S-shaping as a function of the distance along the vertical axis of the raster display, i.e. from top to the center and from the center to the bottom of the raster. This is achieved by modulation of the voltage across the S-capacitor. The modulated voltage appears also across the horizontal yoke and causes a modulation of the deflection current.

SUMMARY OF THE INVENTION

The invention provides an inner raster correction circuit allowing adjustment of correction amplitude and of overall S-shaping. A deflection winding is coupled in series with an S-correcting trace capacitor. A deflection switch is coupled to the deflection winding and responsive to a source of an input signal at a first frequency related to a deflection rate, for generating in the deflection winding a trace current during a trace interval and a retrace voltage during a retrace interval. An inside raster distortion correction circuit is coupled across the trace capacitor, for varying the amount of S-correction provided by the trace capacitor. The inside raster distortion correction circuit comprises a distortion correction switch, which is conductive and non-conductive as a function of the value of a source of modulating signal at a second frequency.

DETAILED DESCRIPTION

FIG. 1 shows raster displays with different inner raster distortions. Also shown are waveforms of the voltage across the S-capacitor and the modulation envelope. It is assumed that outside pincushion distortion is corrected by amplitude modulation of the deflection current. This is illustrated by the straight vertical lines at the extreme left and right hand side of the shown raster displays.

Figure 1A:
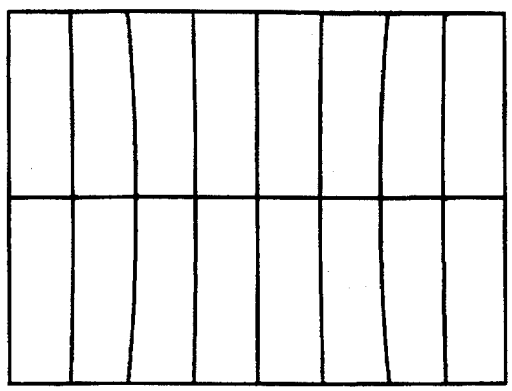
FIGS. 1a to 1f show raster displays with different raster distortions, and the variation of the S-correction which is necessary to correct such distortions.
Figure 1D:
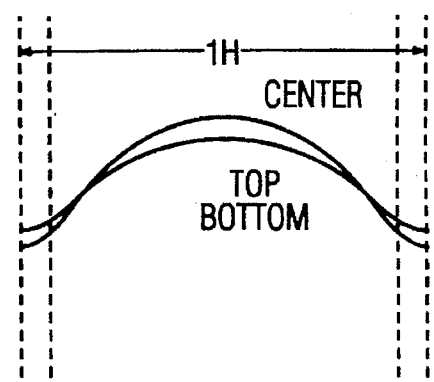

FIG. 1a shows an inner pincushion distortion error. The correction, shown in FIG. 1d, requires more S-shaping in the center than at top and bottom.

Figure 1B:
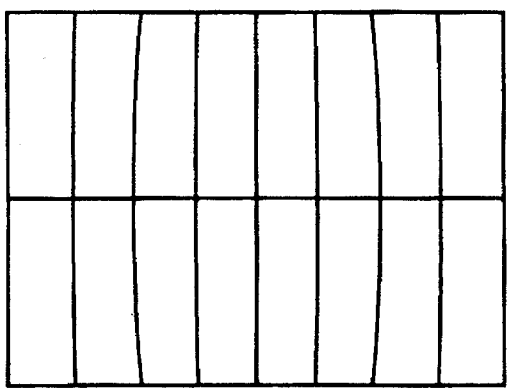
Figure 1E:
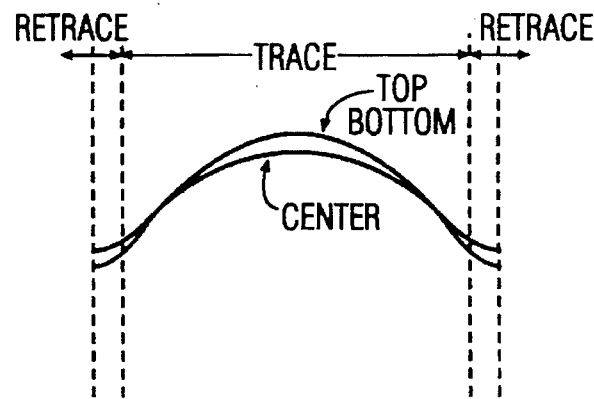

FIG. 1b shows an inner barrel error. As shown in FIG. 1e, more S-shaping is required at top and bottom than in the center.

Figure 1C:
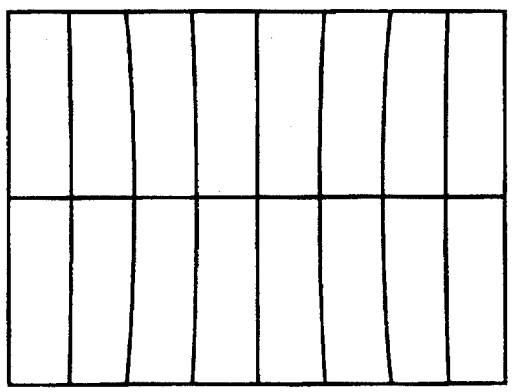
Figure 1F:
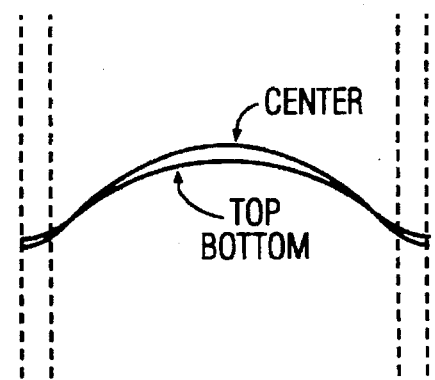

FIG. 1c shows a second order inner pincushion error. The average space differs between the vertical lines at center and top/bottom. As shown in FIG. 1f, the correction requires less pincushion and a flatter waveform shape at top and bottom. This is obtained by a modulation frequency higher than line frequency.

Figure 2:
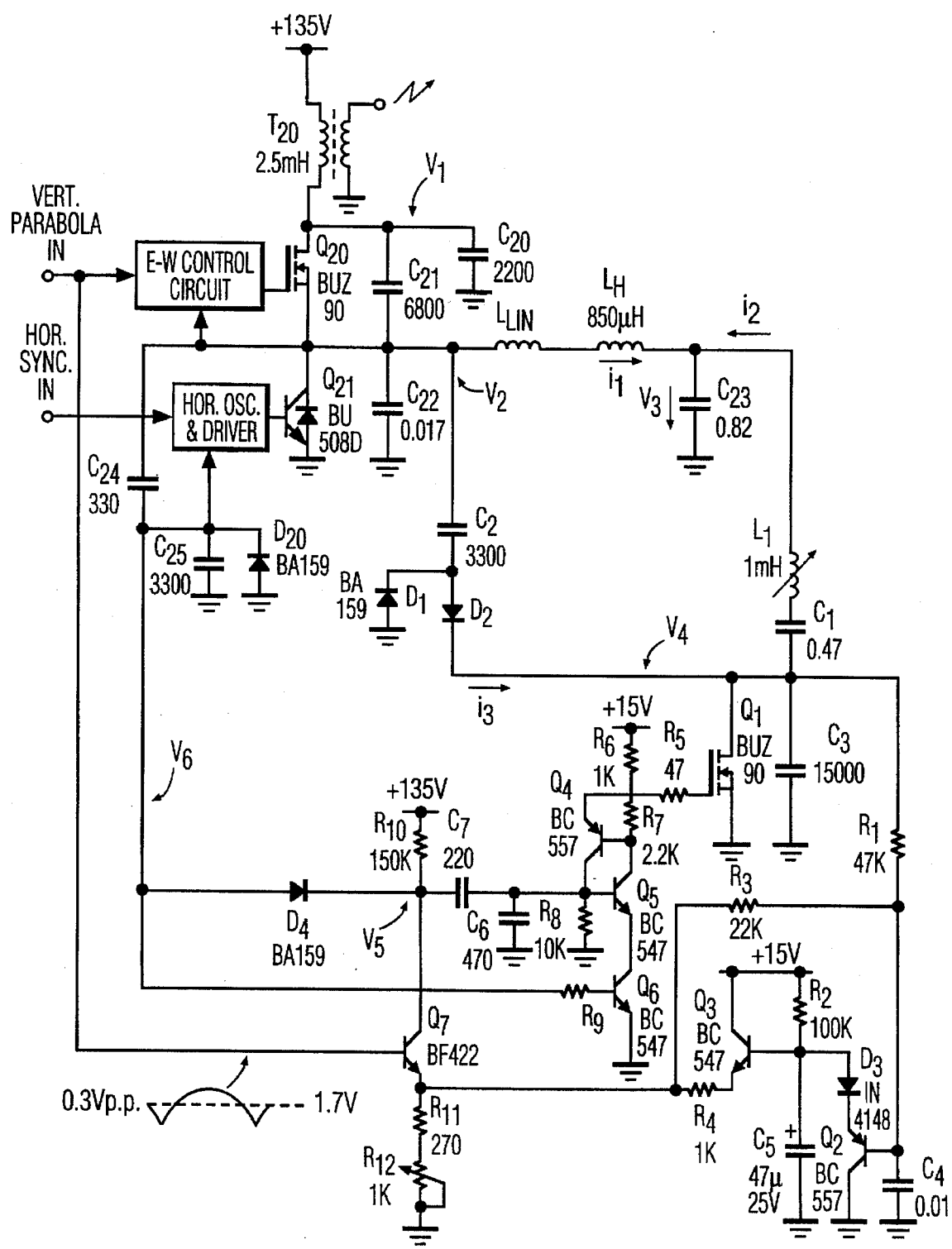
FIG. 2 shows a diagram in block and schematic form of a deflection circuit of a preferred embodiment of the invention.
Figure 3:
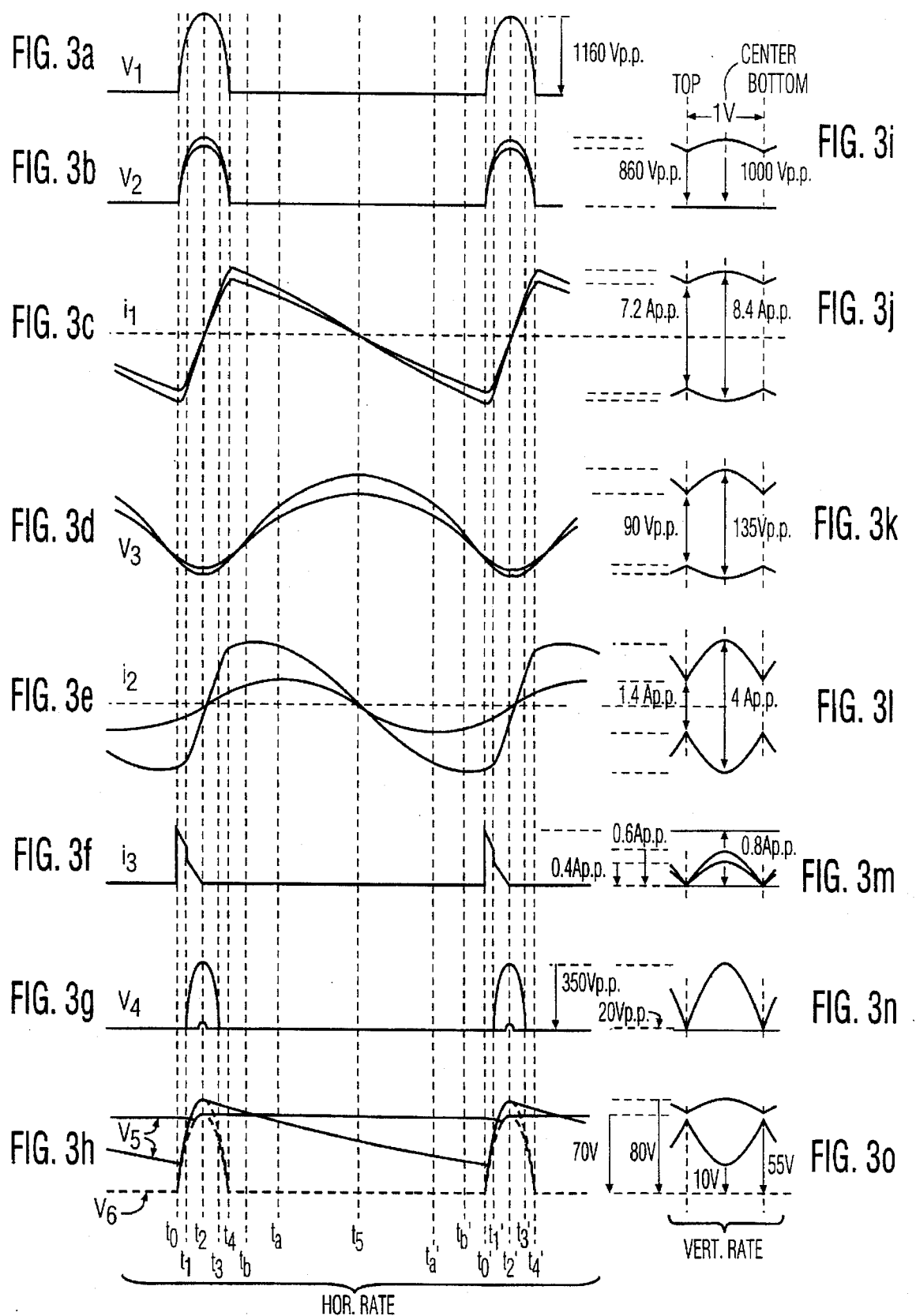
FIGS. 3a to 3o show current and voltage waveforms at several points in the circuit of FIG. 2.

FIG. 2 shows a circuit diagram of a horizontal deflection circuit with outside pincushion correction and with the inventive circuit for the correction of the inner raster distortion such as inner pincushion distortion. The circuit has been used to generate deflection current for a SONY Trinitron picture tube Type A68JYL61X.

FIGS. 3a to 3h shows waveforms at the horizontal rate, and FIGS. 3i to 3o show waveforms at the vertical rate, from the circuit of FIG. 2.

The primary winding of flyback transformer $T_{20}$ supplies energy via E-W switching transistor $Q_{20}$ to the horizontal deflection circuit consisting of switching transistor $Q_{21}$, retrace capacitor $C_{22}$, linearity coil $L_{LIN}$, horizontal yoke winding $L_H$ and S-shaping capacitor $C_{23}$. Transistor $Q_{21}$ is driven in conventional manner by the horizontal oscillator and driver. The E-W control circuit turns off $Q_{20}$ at controllable instants during the first half of the retrace interval to amplitude modulate the retrace voltage $V_2$ across $C_{22}$ and in turn the deflection current $i_1$ flowing through $L_H$. Capacitor $C_{20}$ acts as retrace capacitor for the primary winding of $T_{20}$. Capacitor $C_{21}$ couples the transformer retrace circuit $T_{20}$, $C_{20}$ to the deflection retrace circuit $C_{22}$, $L_H$ and $C_{23}$. The retrace voltage $V_2$ is divided by $C_{24}$, $C_{25}$ to obtain a low voltage retrace pulse $V_6$ across clamping diode $D_{20}$.

Waveform 3a shows the flyback transformer retrace voltage $V_1$ non modulated because of stabilized supply voltage +135 V.

Waveform 3b shows the deflection circuit retrace voltage $V_2$ modulated by the action of $Q_{20}$.

Waveform 3C illustrates the amplitude modulated deflection current $i_1$ for the correction of the outside pincushion distortion. The waveforms on the right side show the parabolically shaped envelopes at the vertical rate.

The inside pincushion correction circuit consists of $L_1$, $C_1$, retrace capacitor $C_3$, switching transistor $Q_1$, $D_1$, $D_2$ and $C_2$. Transistors $Q_4$ to $Q_7$ generate the gate pulses for $Q_1$. Transistors $Q_2$, and $Q_3$ provide feedback for linear operation. Correction current i2 flows through $Q_1$, $C_1$, $L_1$ and $C_{23}$ during the trace interval. $Q_1$ is turned off at modulated instants during the first half of the retrace interval $t_1$–$t_2$, and turns on during interval $t_2$–$t_3$ when the integrated anti parallel diode of $Q_1$ becomes forward biased. When $Q_1$ is turned off, current $i_2$ flows through $C_3$ and produces a retrace voltage $V_4$, shown in FIG. 3g. Deflection energy is fed via $C_2$ and $D_2$ into $C_3$ during the modulated interval $t_1$–$t_2$ to enhance the amplitude modulation of $i_2$.

Waveform 3e shows the envelope of the modulated current $i_2$. The low amplitude of $i_2$ is obtained when $Q_1$ does not turn off, or when it turns off just before $t_2$. The sine wave shaped $i_2$ with peak amplitudes at $t_a$ and $t_a'$ is generated by $V_3$ across $C_{23}$. The amplitude of $i_2$ increases when the turn off instant of $Q_1$ is advanced toward $t_1$. During the retrace interval $t_1$–$t_3$, the current path of $i_2$ is switched to a higher frequency by the insertion of $C_3$. The rapid current change between $t_1$–$t_3$ results in a frequency decrease of $i_2$ between $t_3$–$t_1'$ indicated by the shift of the amplitude peaks from $t_a$ to $t_b$ and from $t_a'$ to $t_b'$.

The $i_2$ current waveform with peaks at $t_b$ and $t_b'$ is nearer to the resonant frequency of the $i_2$ current path, resulting in a higher amplitude than the waveform with the peaks at $t_a$ and $t_a'$. Thus $L_1$ is adjusted to a resonant frequency slightly lower than the envelope of $i_2$, i.e. $2(t_4-t_0')^{-1}$. A further increase of the $i_2$ amplitude modulation is obtained by deflection retrace current $i_3$. During interval $t_0$–$t_1$, down-ramping current $i_3$ flows through $Q_1$. When $Q_1$ opens at $t_1$, $i_3$ decreases because of the impedance formed by $C_3$, $C_1$, $L_1$ and $C_{23}$. Between $t_1$–$t_2$, $i_3$ charges $C_3$, producing an increase of $V_4$ and in turn of $i_2$. When the turn-off instant of $Q_1$ is retarded toward $t_2$, $i_3$ charges $C_3$ during a shorter time interval, resulting in less $V_4$ amplitude. Diode $D_2$ is non-conductive during interval $t_2$–$t_3$. Capacitor $C_2$ discharges via $D_1$ during this time.

The turn-off instant of $Q_1$ is advanced in a parabolic manner from $t_2$ at the top of the raster to $t_1$ at the center of the raster, and retarded to $t_2$ at the bottom of the raster to produce the current $i_2$ envelope of waveform 3e and the retrace voltage $V_4$ envelope of waveform 3g. The waveforms at vertical rate on the right hand side illustrate the parabolic modulation similar to the input voltage at the base of $Q_7$. Currents $i_1$ and $i_2$ are added in the S-shaping capacitor $C_{23}$ to modulate voltage $V_3$ of waveform 3d.

As a result, deflection current $i_1$, waveform 3c, shows S-shaping modulated at the vertical rate. Current $i_1$ is more S-shaped at the center of the raster (high amplitude) than at top and bottom of the raster (low amplitude).

Deflection retrace voltage $V_6$, dashed line waveform 3h, enables, via $R_9$, the gate turn off circuit $Q_6$, $Q_5$ and $Q_4$ during interval $t_0$–$t_4$. Voltage $V_6$ charges capacitor $C_7$ via $D_4$. The leading edge of the charge current pulse turns on $Q_5$ and $Q_4$ to turn off $Q_1$. $Q_4$ and $Q_5$ are held conductive by positive feedback until $t_4$ when $Q_6$ is turned off. The parabolically shaped collector current of $Q_7$ discharges $C_7$ in a way that $D_4$, $Q_5$ and $Q_4$ become conductive at modulated instants during interval $t_1$–$t_2$, as shown by voltage $V_5$, solid waveform 3h. Voltage $V_6$, dotted waveform, is amplitude modulated due to the outside pincushion correction circuit. Transistor $Q_7$ discharges $C_7$ more rapidly at the center of the raster than at top and bottom, illustrated by the down ramping voltage $V_5$, solid waveform. The amplitude of $V_5$ at the end of trace determines the turn-on instant of $D_4$, $Q_5$ and $Q_4$. The feedback path $R_1$, smoothing capacitor $C_4$ and $R_3$ linearizes the operation of the inside pincushion correction circuit. The correction amplitude is adjustable by variable resistor $R_{12}$. The working point of $Q_7$ is controlled by $Q_2$ and $Q_3$ in a manner that voltage $V_4$ is minimum at the top and bottom of the raster to obtain a current $i_2$ envelope as illustrated by waveform 3e. Transistor $Q_2$ discharges capacitor $C_5$, via $D_3$, to the lowest voltage of the vertical rate envelope of $V_4$ across $C_4$. The voltage across $C_5$ is fed via emitter follower $Q_3$ and $R_4$ to the emitter of $Q_7$ to reduce the collector current and to minimize voltage $V_4$ at the top and bottom of the raster.

The overall S-shaping of the horizontal deflection circuit can be optimized by fine tuning of $L_1$. This slightly changes the amplitudes of the waveform envelopes of FIG. 3d and 3e. The limits of $L_1$ tuning are:

If $L_1$ is too small, it will cause deflection compression at the end of trace.

If $L_1$ is too large, it will produce inadequate inner pincushion correction.

It is to be noted that the direction of the correction current in the S-capacitor may be the same or opposite to the deflection current, resulting in additive or subtractive correction. In this way, correction may be provided for either inner pincushion or inner barrel distortion.

Figure 4:
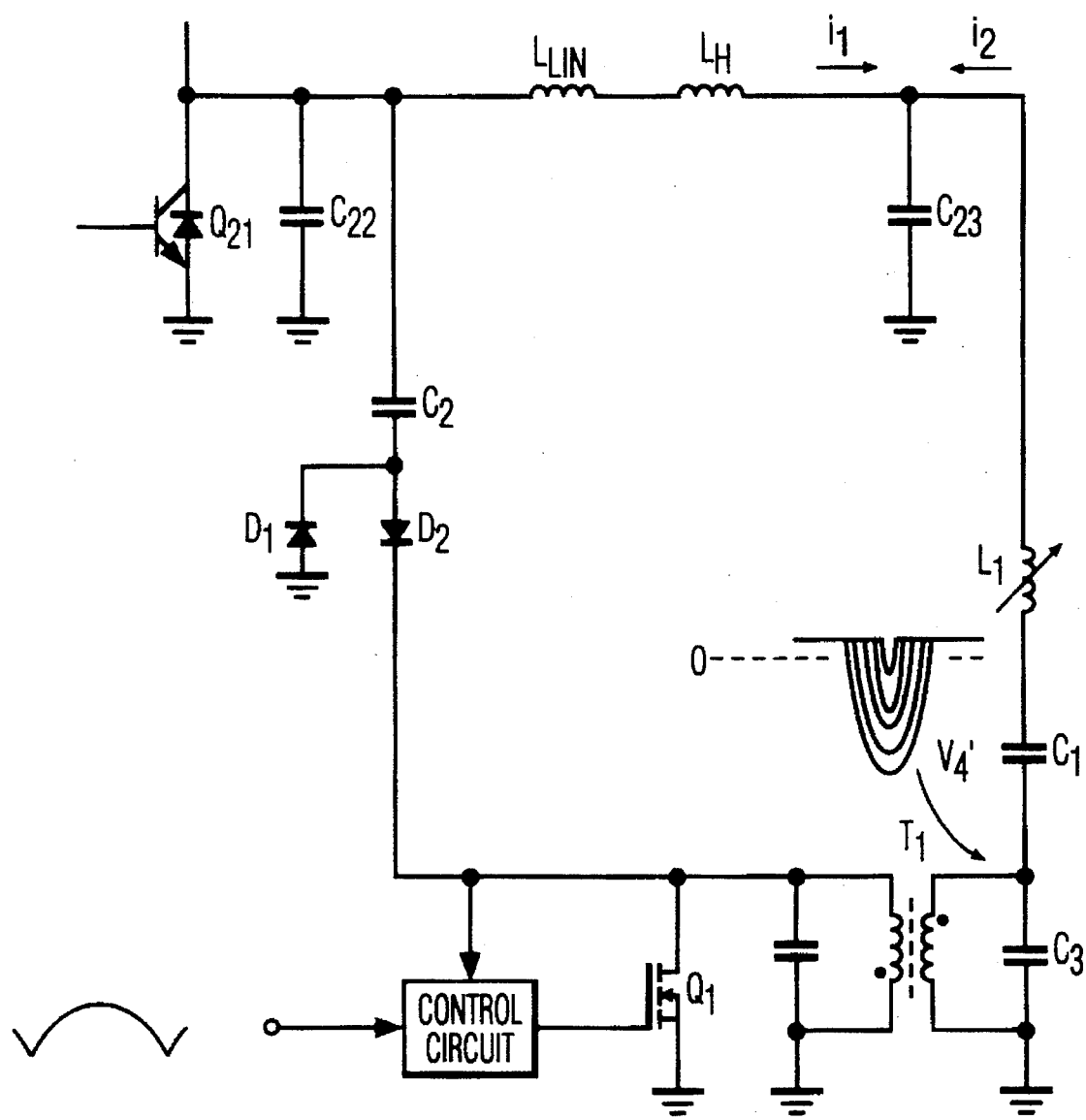
FIG. 4 shows an alternate embodiment of the invention.

FIG. 4 shows a an alternative embodiment of the invention which employs a transformer $T_1$ to obtain a negative voltage $V_4'$ across $C_3$. The envelope of the modulated current $i_2$ decreases to zero and increases in the opposite phase from that shown in FIG. 3e. Thus, in capacitor $C_{23}$, current $i_2$ subtracts from $i_1$. Accordingly, the component values of $C_{23}$, $L_1$, $C_1$ and $C_3$ are smaller at the cost of providing transformer $T_1$.

The amount of inner raster correction is adjustable independent of the outside raster correction. Furthermore, since the inner raster correction circuit is independent of the flyback transformer, the inner raster correction is not affected by changes in flyback transformer loading, such as by changes in display screen brightness.

I claim:

1. A deflection apparatus with raster distortion correction, comprising:
    a) a deflection winding coupled in series with an S-correcting trace capacitor, said series combination coupled across a retrace capacitor;
    b) a source of an input signal at a first frequency related to a deflection rate;
    c) a deflection switch coupled to said deflection winding, and responsive to said source of input signal, for generating in said deflection winding a trace current during a trace interval and a retrace voltage during a retrace interval;
    d) a source of modulating signal at a second frequency;
    e) a first raster distortion correction switch circuit means coupled to said retrace capacitor for varying the charge in said retrace capacitor as a function of said modulating signal, and
    f) a second raster distortion correction switch circuit means coupled to said trace capacitor for varying the charge in said trace capacitor as a function of said modulating signal.

2. A deflection apparatus according to claim 1, further comprising a resonant circuit coupled to said trace capacitor.

3. A deflection apparatus according to claim 2, wherein said second switch circuit means couples a distortion correction retrace capacitor in series with said resonant circuit.

4. A deflection apparatus according to claim 3, wherein said second switch circuit means is coupled across said distortion correction retrace capacitor.

5. A deflection apparatus according to claim 3, wherein said second switch circuit means is transformer coupled across said distortion correction retrace capacitance.

6. A deflection apparatus according to claim 1, wherein said deflection switch supplies additional current to said trace capacitor.

7. A deflection apparatus according to claim 6, wherein said additional current flows in a path comprising a capacitance and a unidirectional current conducting means, for charging said capacitance.

8. A deflection apparatus according to claim 7, comprising a second unidirectional current conducting means for discharging said capacitance.

9. A deflection apparatus according to claim 1, in which said second switch circuit means comprises a controllable switch, said apparatus comprising feedback means coupled from a main current conducting terminal of said controllable switch to a control terminal thereof.

10. A deflection apparatus according to claim 9, in which said feedback means comprises a transistor amplifier.

11. A deflection apparatus according to claim 1, in which said first raster distortion correction switch circuit means comprises means for correcting for outside raster distortion.

12. A deflection apparatus according to claim 11, comprising a deflection transformer, said means for correcting for outside raster distortion being coupled between said deflection switch and a source of supply power through said deflection transformer.

13. A deflection apparatus according to claim 12, in which said deflection rate is a horizontal deflection frequency, and said means for correcting outside raster distortion comprises a switch controlled as a function of vertical deflection.

14. A deflection apparatus according to claim 1, in which said deflection rate is a horizontal deflection frequency and said second frequency is related to a vertical deflection frequency.

15. A deflection apparatus according to claim 9, comprising a capacitance coupled across said controllable switch.

16. A deflection apparatus according to claim 9, in which said controllable switch is conductive during said trace interval, and becomes non-conductive during said retrace interval.

17. A deflection apparatus according to claim 16, in which said controllable switch becomes non-conductive at a variable point in time during the first half of said retrace interval.

* * * * *